March 1, 1932.   H. ALBERTINE   1,847,684
LUBRICATING SYSTEM
Filed Aug. 30, 1926
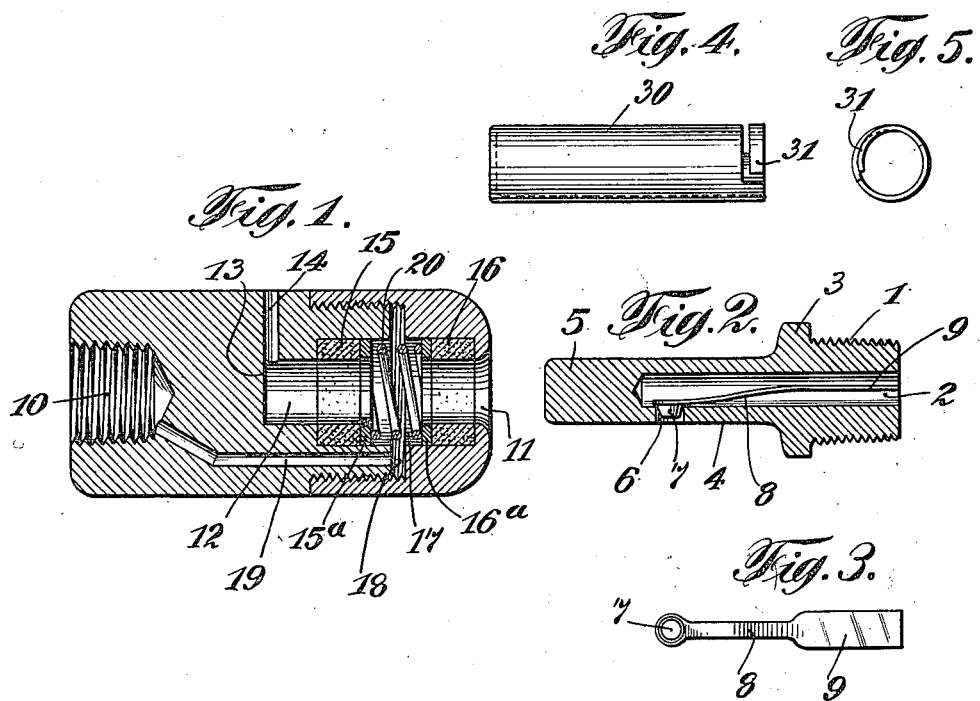
INVENTOR
Herman Albertine
BY
his ATTORNEY Patented Mar. 1, 1932

1,847,684

UNITED STATES PATENT OFFICE

HERMAN ALBERTINE, OF EAST RUTHERFORD, NEW JERSEY, ASSIGNOR, BY MESNE ASSIGNMENTS, TO ROGERS PRODUCTS CO. INC., A CORPORATION OF NEW JERSEY

LUBRICATING SYSTEM

Application filed August 30, 1926. Serial No. 132,453.

My present invention is shown as embodied in a system for forcing grease through the ducts of bearings on automobiles and other machinery, particularly in cases where the duct inlets are nipples permanently secured to the ducts and the lubricant is supplied through a readily detachable coupling, as in recently expired British patent to Alley and Woodvine, No. 21,893, of 1906, Oct. 4.

The system shown in said British patent involves the use of a screw as the coupling means and there have been many proposed substitutes and equivalents for the screw. As contrasted with these systems, my present invention contemplates entirely dispensing with the screw and all equivalents therefor, by employing a simple tube element sliding over the nipple without rotation or lateral interlock therewith, but so formed and arranged that pressure of the grease through the nipple operates automatically to seal the joint. An important feature is that the coupling thus effected is not only automatic, but it is longitudinally balanced so that pressures may be applied to the grease up to 20,000 pounds or more per square inch, without developing any substantial endwise thrusts such as could operate to blow the tubular coupling off of the tubular nipple.

The above and other features of my invention will be more fully understood from the following description in connection with the accompanying drawings, in which Figs. 1 and 2 are longitudinal axial sections of the detachable tubular coupling member and the tubular nipple to which it is applied;

Fig. 3 is a face view of the detail;

Figs. 4 and 5 are respectively side elevation and end view of a cap which may be applied over the nipple to protect the same.

The nipple is shown as provided with the customary screw-threaded end 1, whereby it is permanently secured with passage 2 in proper supply relation with the lubricating duct on the automobile or other machine, an annulus 3 being preferably provided to facilitate screwing the nipple in place. The coupling end of the nipple is simply a tube, 4, closed at the outer end 5 and having a lateral inlet 6, normally closed by check valve 7 carried by the end of a leaf spring, 8, having a shank 9 of proper width for firm driving fit diametrically of the passage 2. The nipple is thus without any means for locking engagement with the nozzle.

The coupling has an inlet 10, screw-threaded for connection to any high pressure source. The other end is essentially a cylindrical cavity, having an outer end 11 which may be rounded to assist in guiding the coupling over the closed end 5 of the nipple. The inner end, 12, has a bottom, 13, against which the closed end of the nipple may abut, and the bottom preferably has a relief vent, 14, for escape for surplus grease which otherwise might tend to clog the cavity 12. Intermediate its ends, 11, 12, the tubular cavity is enlarged to afford housing for cooperating washers 15, 16, spaced apart so as to afford an intermediate cylindrical cavity 17, the diameter of which is approximately the same as that of the washers. Thus the walls of the cavity confine the washers against outward radial expansion when pressure is applied to the exposed ends of the same. Midway between the washers, the cavity is cylindrically enlarged as at 18, to form an annular distributing groove in which the grease is delivered through duct 19 communicating with inlet 10.

The washers are firmly spring pressed in opposite directions by the intermediate spring 20, having its opposite ends bearing on metal washers 15a, 16a, whereby the pressure of the spring is uniformly distributed over the surface of the washer. The washers 15, 16, are of yielding material, preferably leather, preferably of the softer grades, and their interior diameter is substantially the same as that of the nipple, while the interior diameters of the metal washers, 15a, 16a, are preferably somewhat greater, so that while the tubular nipple may slide smoothly in contact with the inner walls of the leather washers, the end of the nipple will not be likely to catch on the metal washers.

A convenient way of providing the above interior construction is to have the outer end of the nipple in the form of a cap, as shown, the inner face of the cap affording one wall of the annular space 18 and the end face of the body portion forming the other wall.

It will be noted that the distance from the annular space 18 to the bottom of cavity 12 corresponds to the distance between the closed end 5 of the nipple, and the valved inlet opening at 6.

The operation of such apparatus will be obvious. The coupling shown in Fig. 1 is simply shoved over the tubular nipple, thereby putting the nipple inlet 6 in registry with the supply cavities 17, 18, the washers 15, 16, engaging the periphery of the nipple, one on one side and the other on the other side of the nipple inlet duct 6. Then when the pressure of the grease is applied, it takes effect primarily on the adjacent exposed ends of the washers, thereby endwise compressing the same. As radial outward expansion is prevented by fit of the washers within the cylindrical cavity 17, this endwise pressure of the grease, added to the initial pressure of spring 20, operates to squeeze the outer cylindrical walls of the washer more tightly against such confining walls. Consequently, the compression takes effect as inward expansion of the washers, forming tightly packed joints preventing escape of grease in either direction but permitting free flow thereof through the inlet duct 6. The more powerful the pressure of the grease, the more powerful is the inward squeezing of the leather washer, and experience shows that the above described pressures of 20,000 pounds or more will not produce leaks.

The important feature is that this application of packing and the proportional tightening thereof is entirely automatic, and that the pressure of the grease is perfectly balanced internally by being exerted equally and oppositely on equal oppositely directed surfaces. As a result, the pressure secures the coupling on the nipple only to the extent practically necessary to prevent accidental displacement thereof, and when the pressure is removed, there is no obstacle whatever to the straight endwise removal of the coupling.

The straight cylindrical form of the nipple permits the use of a straight cylindrical cap 30, having a simple spring clamping lip 31 frictionally engaging the cylindrical side of the nipple. The cap therefor slides off and on endwise, without manipulation, as readily as does the coupling.

While not practically convenient for my present purpose, it will be obvious that the automatically tightening packing 15, 16, could be located in a cavity on the exterior of the nipple, in which case the telescoping cavity on the supply nozzle could be a simple cylinder without any packing.

Though at present deemed inadvisable, it would be also possible to use a cylindrical nipple as the supply conduit from the pump with a device like that of Fig. 1 used as the fixture on the machine.

I claim:

A conduit coupling including a tubular nipple having a lateral port and closed outer end, in combination with a coperating member fitting endwise over said nipple and having a radially presented port adapted to register with said nipple port, thereby causing radially-directed, endwise-balanced pressure of the grease between said coupling members, and one of said coupling members having thick-walled, flat-ended, perforated washers fitting between said members radially, and confined thereby against radial expansion either inward or outward; said washers being also spaced apart with their adjacent end faces exposed to the pressure of the grease and their remote end faces confined by radially extending abutments, together with an intermediate spring normally pressing said washers into engagement with said abutments.

Signed at New York in the county of New York and State of New York this 28th day of August, A. D. 1926.

HERMAN ALBERTINE.